(12) United States Patent
Li et al.

(10) Patent No.: US 9,944,562 B2
(45) Date of Patent: Apr. 17, 2018

(54) CERAMIC GRANULES HAVING HIGH REFLECTIVITY AND PREPERATION METHOD FOR THE SAME

(71) Applicant: SHIJIAZHUANG NIKKA MINTECH CO., LTD., Shijiazhuang, Hebei Province (CN)

(72) Inventors: Zhijie Li, Shijiazhuang (CN); Hongwei Lu, Shijiazhuang (CN)

(73) Assignee: Shijiazhuang Nikka Mintech Co., Ltd., Shijiazhuang, Hebei Province (CN)

( * ) Notice: Subject to any disclaimer, the term of this patent is extended or adjusted under 35 U.S.C. 154(b) by 38 days.

(21) Appl. No.: 15/012,043

(22) Filed: Feb. 1, 2016

(65) Prior Publication Data
US 2017/0174575 A1  Jun. 22, 2017

(30) Foreign Application Priority Data

Dec. 18, 2015 (CN) .......................... 2015 1 0954789

(51) Int. Cl.
| | |
|---|---|
| C04B 35/18 | (2006.01) |
| C04B 35/628 | (2006.01) |
| C04B 35/626 | (2006.01) |
| C04B 38/00 | (2006.01) |

(52) U.S. Cl.
CPC .......... *C04B 35/18* (2013.01); *C04B 35/6262* (2013.01); *C04B 35/62675* (2013.01); *C04B 35/62802* (2013.01); *C04B 35/62805* (2013.01); *C04B 35/62807* (2013.01); *C04B 35/62813* (2013.01); *C04B 35/62894* (2013.01); *C04B 38/009* (2013.01); *C04B 2235/3463* (2013.01)

(58) Field of Classification Search
CPC ..................................................... C04B 35/18
See application file for complete search history.

(56) References Cited

U.S. PATENT DOCUMENTS

| | | | |
|---|---|---|---|
| 1,898,345 A | 2/1933 | Denning | |
| 3,208,571 A | 9/1965 | Bochory | |
| 3,255,031 A | 6/1966 | Lodge et al. | |
| 3,479,201 A | 11/1969 | Sloan | |
| 7,241,500 B2 | 7/2007 | Shiao et al. | |
| 8,790,778 B2 | 7/2014 | Shiao et al. | |
| 8,865,303 B2 | 10/2014 | Sexauer et al. | |
| 2005/0142084 A1* | 6/2005 | Ganguly | A61K 8/26 424/63 |

FOREIGN PATENT DOCUMENTS

JP   H09256711   9/1997

OTHER PUBLICATIONS

Tobelite, Higashi S., "A New Ammonium Dicotahedral Minca," Mineralogical Journal 1982, 3:138-146.
Qiming, Z. et al., "Mineralogy and Origin of Ammonium-illite of the Carboniferous Taiyuan Formation in Jincheng and Yangquan Districts of Shanxi Province," Journal of Palaeogeogaraphy, 2011, 13 (5):501-508.

* cited by examiner

Primary Examiner — Alexandre F Ferre
(74) Attorney, Agent, or Firm — Michael Best & Friedrich LLP

(57) ABSTRACT

Ceramic granules having high reflectivity and a preparation method for the same comprise sand core particulates and at least one coating thereon, wherein said sand core particulates contain calcined tobelite that is obtained by calcining the tobelite ore at 700-1200° C.; and said sand core particulates are coated with an inorganic coating, and then calcined at 800-1200° C. to obtain ceramic granules. Said ceramic granules have a particle size of 0.1-3.5 mm, and have a solar reflectivity SR of not lower than 80% and a staining index DL* of lower than 6%. Said ceramic granules produce a solar reflectivity of not lower than 70% when being applied to the asphalt roll/sheet and a solar reflectivity of not lower than 72% when being applied to the polyurethane foam sheet.

16 Claims, 4 Drawing Sheets

CERAMIC GRANULES HAVING HIGH REFLECTIVITY AND PREPERATION METHOD FOR THE SAME

TECHNICAL FIELD

The present invention relates to ceramic granules having high reflectivity and a preparation method for the same. More particularly, the present invention relates to ceramic granules comprising sand core particulates and at least one coating thereon, wherein said sand core particulates contain calcined tobelite, and a preparation method for such ceramic granules.

BACKGROUND

The literatures are cited in the present description for the purpose of describing the state of the art to which the present invention pertains, and are incorporated herein by reference in their entire disclosures.

In 2009, U.S. Energy Secretary Steven Chu proposed that, in order to solve the problem of global warming, all of the nations should paint the building's roofs white as much as possible to increase solar reflectivity of roofs, reduce the greenhouse effect, and achieve the energy saving and decreased consumption.

A construction law is issued in the state of California, US to require the low slope roofing achieves the reflectivity of at least 70%. It is a very efficient heat shield technology to apply sand having high reflectivity onto the surface of the asphalt roofing. Compared with the reflective material such as plastics, metal, and organic coating, sand having high reflectivity has the characteristic of low cost and weather resistance. But, for most of white granules available in the market, such as quartz, calcite, calcined kaolin, and synthetic ceramic granules, the accumulated granules are usually measured to have high reflectivity, but after being applied to a black substrate, due to its low opacity to UV radiation, as well as being usually accompanied by a remarkable oil-absorbing phenomenon, it results in color change, and a further reduction in the reflectivity. In order to achieve the requirement of the reflectivity of 70%, a reflective coating can be applied on the granule roofing product. However, the polymeric organic coating has a short life span and therefore it is necessary to re-apply the coating after several years, such repeated applying results in high cost.

U.S. Pat. No. 8,865,303 B2 discloses a cool roofing system, which includes highly reflective calcined kaolin granules having a reflectance of 80% to 92%. When coated with a polymeric organic coating and applied to a roofing substrate, the highly reflective kaolin granules produce a roofing system having a reflectance of 70% or more.

JPH08-091892 points out that, when the conversion from the crystalline phase of kaolin to crystalline phase of mullite is enhanced, the laminated structure of kaolin crystalline will be broken and the whiteness will be lowered. In order to solve the problem, a part of residual kaolin crystalline can maintain laminated structure by adjusting the grinded particle size, pelletizing or shaping, adjusting the calcination temperature (1500-1700° C.) and the like. This can not only increase the reflectivity at the particle interface and the whiteness, but also increase the opacity and improve the overall reflectivity. However, the above method requires complicated processes such as grinding, pelletizing and shaping, and the calcination should be conducted at a high temperature of 1200-1700° C. Even if the above method is industrialized, it will have the problem of high cost, etc.

Therefore, there is a continuous demand for granules having high reflectivity, low transparency and low oil-absorption.

SUMMARY OF INVENTION

The present invention provides ceramic granules, which comprise sand core particulates and at least one coating thereon, wherein said sand core particulates are calcined tobelite, said at least one coating is an inorganic coating layer, and said ceramic granules have a reflectivity of 80%-93%.

According to the ceramic granules of the present invention, said calcined tobelite is obtained by calcining tobelite ore at 700-1200° C.

According to the ceramic granules of the present invention, the content of tobelite in said tobelite ore is 50 wt %-100 wt %, based on the weight of the tobelite ore.

According to the ceramic granules of the present invention, by X-ray diffraction detection, said calcined tobelite contains a crystalline phase of aluminum silicate and/or a crystalline phase of mullite, and an amorphous phase; and it remains the laminated structure of tobelite.

According to the ceramic granules of the present invention, the average crystallite size, obtained by calculation from the X-ray diffraction peak at 20.07° for aluminum silicate and the X-ray diffraction peak at 16.44° for mullite, is <35 nm.

According to the ceramic granules of the present invention, the sand core particulates coated with the inorganic coating layer are obtained by being calcined at 800-1200° C.

According to the ceramic granules of the present invention, said inorganic coating is a liquid inorganic coating selected from at least one of silicate, aluminum phosphate, silica sol and alumina sol, wherein said silicate is selected from sodium silicate, potassium silicate, aluminum silicate, lithium silicate or a mixture thereof.

According to the ceramic granules of the present invention, wherein said inorganic coating further comprises one or more substances selected from colorants, anti-algae agents, biocides, self-cleaning agents, viscosity modifiers, fluxing agents, flame retardant agents, surface tension modifiers and antiaging agents.

According to the ceramic granules of the present invention, it further comprises an additional coating, which is obtained by secondly coating with an organic coating and/or a water-repellent agent, wherein said organic coating is a resin coating or an emulsion coating, and said water-repellent agent is a silicon-containing water-repellent agent or a fluorine-containing water-repellent agent.

According to the ceramic granules of the present invention, it has a staining index DL* of 0.1%-6%.

According to the ceramic granules of the present invention, said ceramic granules produce a solar reflectivity of 70%-85% when being applied to the asphalt roll/sheet in a coverage of more than 90%.

According to the ceramic granules of the present invention, said ceramic granules produce a solar reflectivity of 72%-90% when being applied to the surface layer of polyurethane foam sheet.

The present invention also provides a process for preparing ceramic granules, which comprises the following steps:
a) calcining and crushing tobelite ore to obtain sand core particulates;
b) coating the sand core particulates with an inorganic coating;

c) calcining the sand core particulates coated with the inorganic coating to obtain ceramic granules.

According to the process for preparing ceramic granules of the present invention, the step (a) is conducted at 700-1200° C., and the step c) is conducted at 800-1200° C.

According to the process for preparing ceramic granules of the present invention, said ceramic granules have a solar reflectivity of 80%-93%.

According to the process for preparing ceramic granules of the present invention, said ceramic granules have a staining index DL* of 0.1%-6%.

The present invention also provides the calcined tobelite granules, which are obtained by calcining tobelite ore at 700-1200° C., and have a reflectivity of 80%-93%.

According to the calcined tobelite granules of the present invention, the granules contain a crystalline phase of aluminum silicate and/or a crystalline phase of mullite, and an amorphous phase; and the granules remain the laminated structure of tobelite.

According to the calcined tobelite granules of the present invention, the crystallite size, obtained by calculation from the X-ray diffraction peak at 20.07° for aluminum silicate and the X-ray diffraction peak at 16.44° for mullite, is <35 nm.

According to the calcined tobelite granules of the present invention, the content of tobelite in said tobelite ore is 50 wt %-100 wt %, based on the weight of the tobelite ore.

DETAILED DESCRIPTION OF THE INVENTION

The following definitions are used herein to further define and describe the disclosure. These definitions apply to the terms as used throughout this specification, unless otherwise limited in specific instances.

Unless otherwise defined, all technical and scientific terms used herein have the same meaning as commonly understood by one of ordinary skill in the art to which this invention belongs. In case of conflict, the present specification, including the definitions set forth herein, will control.

Unless explicitly stated otherwise in defined circumstances, all percentages, parts, ratios, and like amounts used herein are defined by weight.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Ceramic granules of the present invention comprise sand core particulates and at least one coating, wherein said sand core particulates contain calcined tobelite, said at least one coating is an inorganic coating layer. The obtained ceramic granules themselves have a high solar reflectivity, low transparency and low oil absorption, possess an extremely high outdoor durability, and are low-costly. The ceramic granules are particularly suitable for producing asphalt roll/sheet.

Sand Core Particulates

Figure 1:
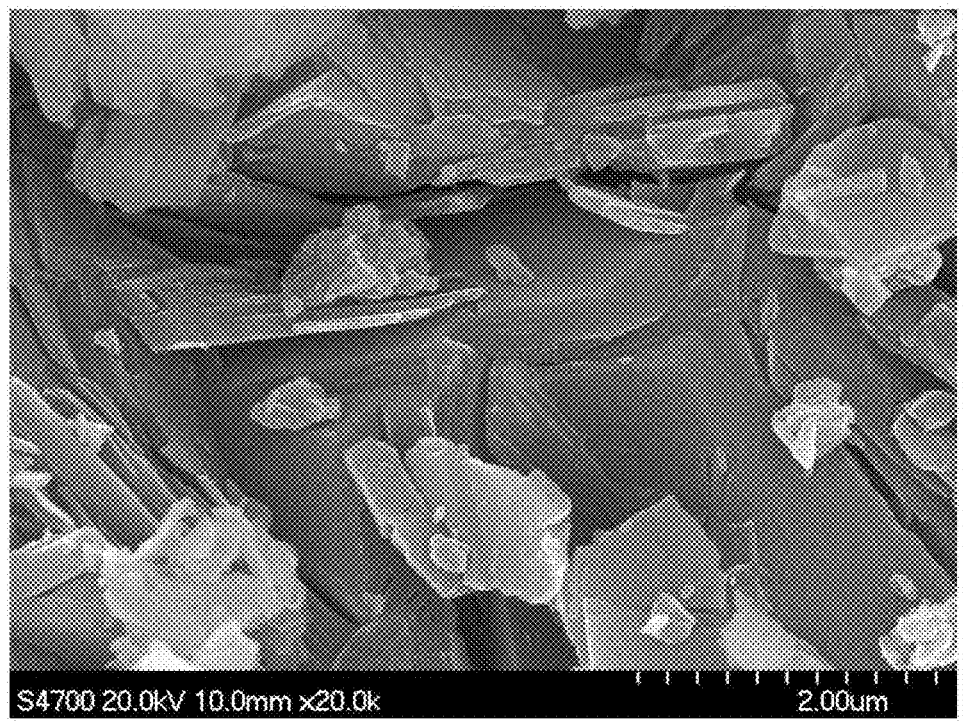
FIG. 1 is a SEM showing the surface of the calcined tobelite which was calcined at 950° C.

According to the present invention, sand core particulates are obtained by calcining tobelite ore at 700-1200° C., 750-1150° C., 800-1100° C., 850-1050° C. or 900-1000° C. and crushing the calcined tobelite; or firstly crushing tobelite ore to an appropriate particle size and then calcining the crushed tobelite at 700-1200° C., 750-1150° C., 800-1100° C., 850-1050° C. or 900-1000° C. The calcined tobelite ore (the calcined tobelite) remains the laminated structure of tobelite (with reference to FIG. 1), and contains a crystalline phase of aluminum silicate and/or a crystalline phase of mullite, and an amorphous phase.

Figure 2:
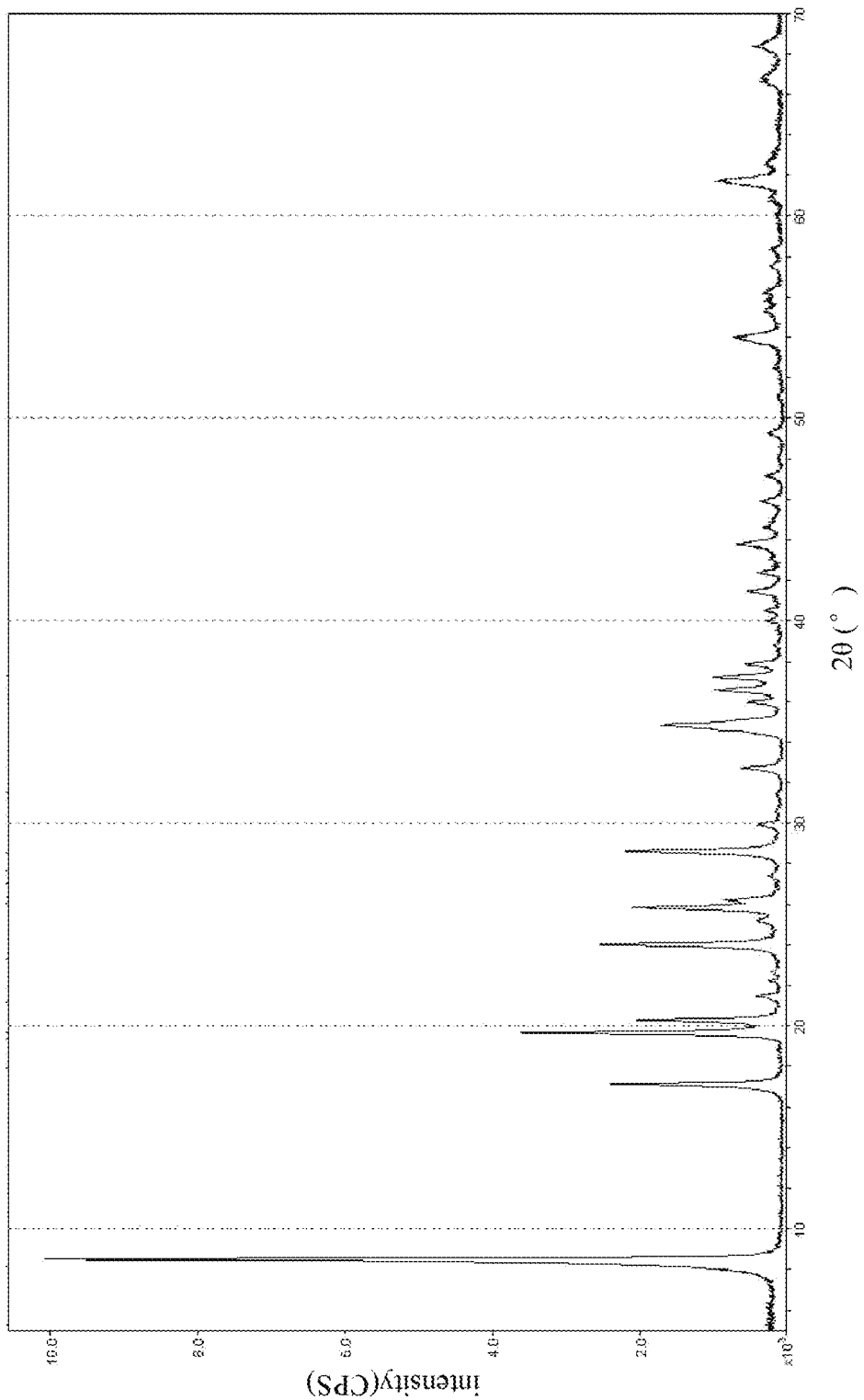
FIG. 2 is an XRD of tobelite ore.

Tobelite ore is a silicate-mica clay mineral containing $NH_4^+$, and its main mineral component is tobelite $[(NH_4)Al_2(Si_3Al)O_{10}(OH)_2]$ (for example with reference to FIG. 2). Tobelite was firstly discovered from china-stone sediments by Higashi in 1982 at Ohgidani, Tobe, Ehime, Japan. It was approved as new mineral and named as Tobelite based on its origin (See Higashi S. Tobelite, a new ammonium dicotahedral minca Mineralogical Journal, 1982, 3: 138-146). It is also known as ammonium illite (with reference to Mineralogy and origin of ammonium-illite of the Carboniferous Taiyuan Formation in Jincheng and Yangquan districts of Shanxi Province, Zheng Qiming, Liu Qinfu, Shen Qi, et al., Journal of Palaeogeogaraphy, 2011, 13 (5): 501-508).

Figure 3:
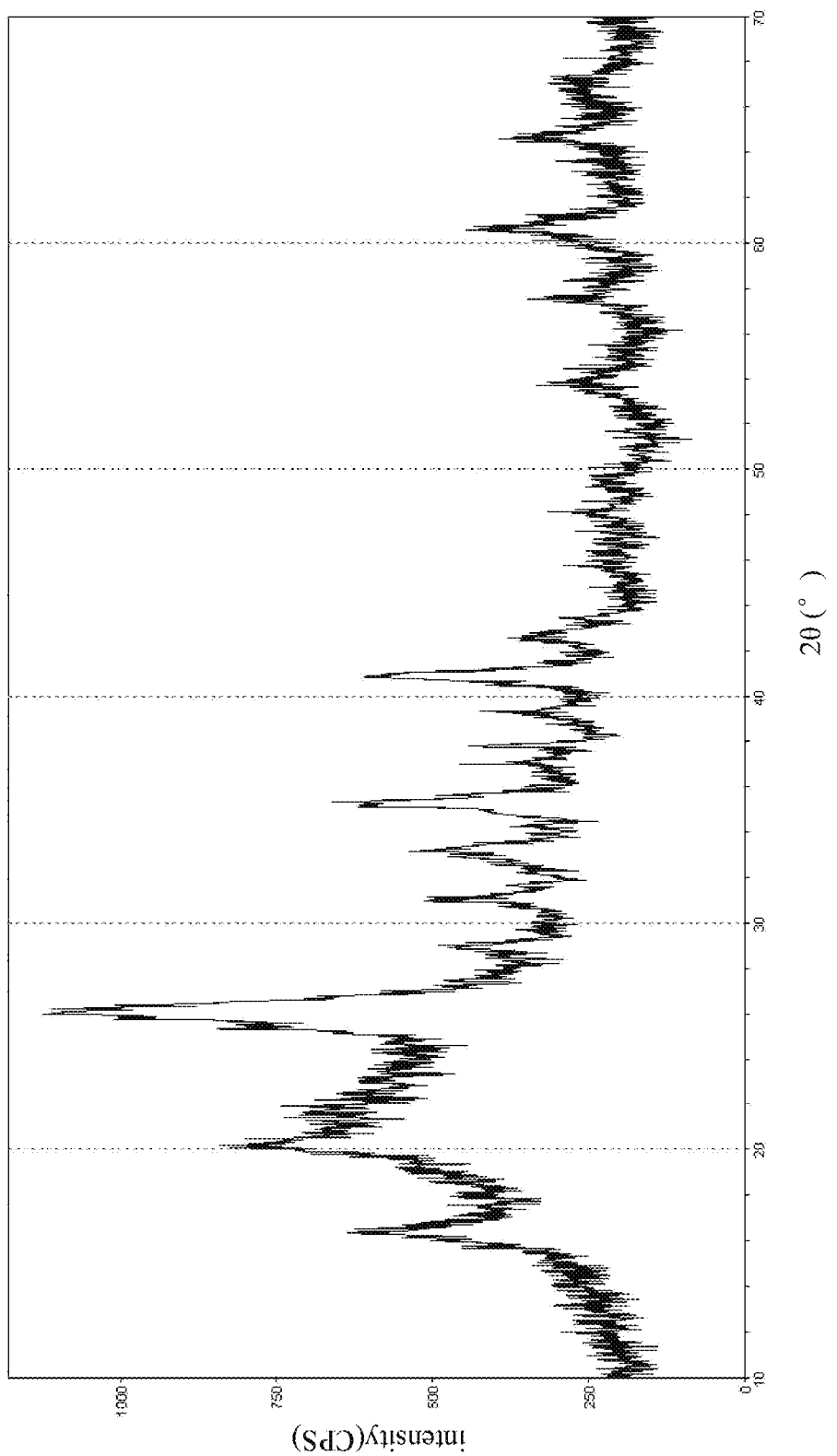
FIG. 3 is an XRD showing the calcined tobelite which was calcined at 950° C.

According to the present invention, sand core particulates are detected with X-ray diffraction (XRD), with reference to FIG. 3. The average crystallite size, calculated with a Scherrer equation from the diffraction peak of aluminum silicate at 20.07° and the diffraction peak of mullite at 16.44° in the XRD chart, is less than 35 nm, preferably less than 25 nm.

A shuttle kiln, a tunnel kiln, a rotary kiln, a shaft kiln, a roller kiln or a down draft kiln with coal, natural gas, heavy oil as fuel can be used in the calcination of sand core particulates of the present invention. The calcined tobelite can be crushed with a jaw crusher, a roll crusher or a hammer crusher, and sieved with a sieving device to adjust the particle size distribution.

In order to obtain the suitable size distribution for roofing granules, sand core particulates are crushed to a range of 0.1-3.5 mm, preferably 0.3-2.3 mm, in particle size.

The tobelite ore useful in the present invention contains 50 wt %-100 wt % of tobelite, preferably 60 wt %-100 wt %, more preferably 70 wt %-100 wt %, further more preferably 80 wt %-100 wt % and most preferably 90 wt %-100 wt %.

The mineral useful in the present invention has been developed and used in the ceramics field in China, Japan, European and the like, but is never reported to be used as a high reflective material. It is surprisingly found by the present inventors that the unique structure of this mineral makes it particularly suitable for making a high reflective material.

Compared with the calcination of the mullite-series granules in the prior art, the calcination method of the present invention is more economic. The calcination temperature can be chosen as lower than 1100° C., preferably lower than 1000° C., so that the production cost can be remarkably reduced. The calcined granules contain a low level of color elements such as Fe and C, have a small crystallite size, and remain the laminated structure of the mineral. The calcination produces a multiple-interface system of high whiteness.

The calcined particulates have the properties such as high-reflectivity and low transparency. The particulates can have a solar reflectivity up to 93%.

However, when directly applied on asphalt based roll/sheet, the sand core particulates will absorb oil and change color, thus result in reflectivity drop. To make the granules more suitable for asphalt substrate, the granules need further surface treatment.

Surface Treatment of Sand Core Particulates

According to the present invention, sand core particulates are coated with an inorganic coating (particularly silicates), then the coated sand core particulates are calcined to produce ceramic granules having high reflectivity and low oil absorption, which are particularly suitable for being ceramic granules for the asphalt-based roofing material. The resulted ceramic granules have a solar reflectivity of 80%-93% and a staining index DL* of 0.1%-6%.

In the prior art, the coating process with inorganic coating always focuses on the low-temperature drying or being conducted below the softening temperature of the silicate, for example, with reference to U.S. Pat. No. 1,898,345, U.S. Pat. No. 3,255,031, U.S. Pat. No. 8,790,778 and the like, all of which are incorporated herein for reference. To be contrary with the above mode, the present invention inventively calcines the sand core particulates coated with inorganic coating at a high temperature to make it ceramization, which not only substantially reduces the oil absorption of the granules and improves the staining resistance, but also further increases the reflectivity of the granules, and also solves the detachment problem of basic metal ion and improves the weather resistance of the granules.

According to the present invention, said inorganic coating is at least one inorganic coating selected from silicate, aluminum phosphate, silica sol and alumina sol.

According to the present invention, sand core particulates are coated with the inorganic coating at a weight percentage of 1-20 wt %, wherein said weight percentage is the ratio of the coating weight to the sand core weight.

According to the present invention, sand core particulates coated with inorganic coating are calcined at 800-1200° C., 850-1150° C., 900-1100° C. or 950-1050° C., so that the coating can reach the ceramization temperature and form an insoluble coating. Preferably, the surface layer of sand core particulates are coated with silicate, then the coating is ceramized at a high temperature of 800-1200° C., 850-1150° C., 900-1100° C. or 950-1050° C. to form a stable, low oil-absorbing, water-repellent and durable surface. The stability of the coating can be determined by measuring the Alkalinity number of the soluble basic ions of the surface. The measurement is conducted according to Test method per Asphalt Roofing Manufacturer Association Granule Test Manual. The Alkalinity number is less than 3, preferably less 1 nm, more preferably less than 0.5.

In an embodiment of the present invention, the surface-treated ceramic granules have a solar reflectivity of at least 80, or at least 83%, or at least 86%, or at least 88%, or at least 90%, and up to 93%.

Figure 4:
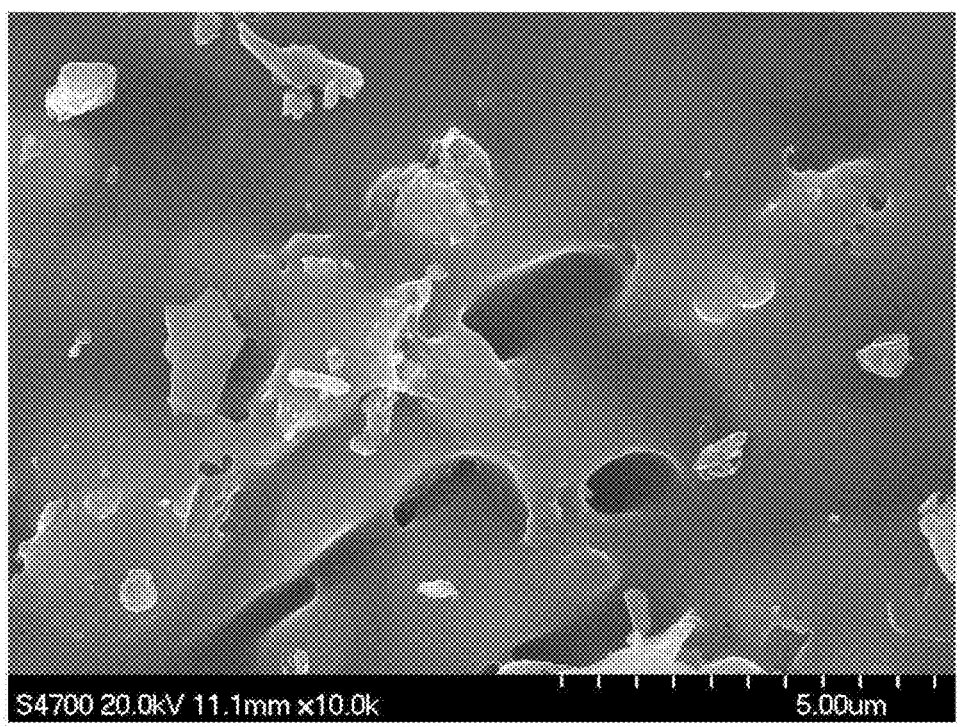
FIG. 4 is a SEM of ceramic granules.

In an embodiment of the present invention, the surface-treated ceramic granules have low oil absorption. Without any secondary treatment with other materials, the staining index DL* after being applied on asphalt-based sheet/roll roofing is less than 6%, less than 5%, less than 4%, or less than 3%, most preferably as low as 0.1%. Without being restricted by any theory, while maintaining high reflectivity, the ceramic granules of the present invention have remarkably lower oil absorption than the granules of the prior art. This is because the calcination of sand core particulates coated with an inorganic coating (particularly silicate) at a particular temperature according to the present invention can form a dense coating layer on the surface of granules (for example, as shown in FIG. 4), and therefore the surface energy of the granules can be reduced.

The inorganic coating used in the present invention is preferably a silicate compound, including flowable liquid metal silicate, such as sodium silicate, lithium silicate, potassium silicate, aluminum silicate or a mixture thereof. The inorganic coating can also be other liquid inorganic coatings, such as aluminum phosphate, silica sol and the like. The coating can be applied with typical coating methods, such as dip coating, pan coating, spray coating, curtain coating, roll coating or spin coating. In addition, the typical coatings, surface-treating agents and coating and surface-treating methods are disclosed in U.S. Pat. No. 7,241,500, U.S. Pat. No. 3,479,201, U.S. Pat. No. 3,255,031 and U.S. Pat. No. 3,208,571, all of which are incorporated herein by reference in their entirety.

If necessary, one or more additives selected from colorants, anti-algae agents, biocides, self-cleaning agents, viscosity modifiers, fluxing agents, flame retardant agents, surface tension modifiers and antiaging agents can be added.

In an embodiment of the present invention, a high reflective fine powder pigment can be added to the silicate coating to further increase the reflectivity of the granules. The high reflective fine powder pigment comprises $TiO_2$ and/or ZnO and the like. In another embodiment, the above coating also has an alga-inhibiting effect, and can eliminate parasitic moss on the roofing, which may result in the granules' color change. In the preparation of the coating, an organic or inorganic insecticide can be added, or in the after-treatment, the granules can be imparted with the insecticidal property. A nano-titanium dioxide can be added so that the granules will have a strong self-cleaning ability.

According to the present invention, the ceramic granules can be treated with a second coating of special properties at a ratio of 0-15 wt %. The second coating comprises resin coating, emulsion coating, fluoro-containing water-proofing agent, and silicon-containing water-proofing agent in order to increase the stain resistance and hydrophobic property of the granules.

The high-temperature ceramization of the coating of sand core particulates can be conducted in a tunnel kiln, a push type tunnel kiln, a rotary kiln, a roller kiln, a shuttle kiln, or a shaft kiln, etc.

The ceramic granules of the present invention have a high solar reflectivity of ≥80%, low oil absorption, and high outdoor durability. The particle size is 0.1-3.5 mm, preferably 0.3-2.3 mm. Such granules are suitable as roofing material, and can be directly used in asphalt-based roofing roll or asphalt tile. The specific applications of the granules are well known to those skilled in the art. For example, the granules can fall by gravity onto a rolling, molten asphalt substrate, and pressed to make the granules embedded in the substrate to form a roofing material, and then processed into an asphalt roll/sheet.

The ceramic granules of the present invention can be used in the surface layer of the roofing material, in which cement, asphalt, polyurethane foam sheet is used as the substrate, and the solar reflectivity of the roofing can be remarkably increased. Said ceramic granules will produce a solar reflectivity of not lower than 70% and up to 85% when being applied to the asphalt roll/sheet and a solar reflectivity of not lower than 72% and up to 90% when being applied to the polyurethane foam sheet.

The ceramic granules of the present invention can also be used in sand coating for buildings to produce a high reflective coating layer, which has the same effect as white granules.

The following examples are provided to describe the invention in further detail. These examples, which set forth specific embodiments and a preferred mode presently contemplated for carrying out the invention, are intended to illustrate and not to limit the invention.

EXAMPLES

The main materials used in the experiments and its specification and sources are listed in Table 1.

TABLE 1

Main materials used in the experiments

| Name | Specification | Origin/Manufacturer |
| --- | --- | --- |
| Sand core particulates | Tobelite ore | Taiyuan, Shanxi Province, China |
| Sodium silicate | Module 1.0-3.5 | PQ (Tianjin) Silicates Technology Co., Ltd., China |
| Silica sol | High pure | Shijiazhuang Shuanglian Chemical Industry Co., Ltd., HeBei Province, China |
| Zinc oxide | High pure | Yongchang Zinc Industry Co. Ltd., Gaoyi County, HeBei Province, China |
| Pure acrylic emulsion | BASF 7051 | ELEPP, Beijing, China |
| Water-repellent agent | Fluorocarbon water-repellent agent 2500 | SINO, Xiamen, China |
| $TiO_2$ | Rutile type | Langfang QiCai Pigments Co. Ltd., Hebei Province, China |

The main properties reported in the present invention were measured according to the following methods.

Determination of the Solar Reflectivity (SR)

The reflectivity of a sample was detected with a reflectometer (Model SRI 1000, manufactured by AZ Technology. Inc., US). The reflectometer was adjusted to the ABS mode to conduct the measurement. The a values were read, recorded, and averaged. Solar reflectivity SR=100−α. For the granules themselves, 50 g of granules sample was placed in a flat-mouth sample plate; the sample was compacted and leveled with a straight-ruler; and 10 points were randomly chosen for the measurement; for the granules on the asphalt sheet, sufficient granules were evenly scattered on a low melt point and sticky asphalt sheet, and compacted and leveled; the granules not adhered to the surface were removed; and 10 points on the asphalt sheet were randomly chosen for the measurement.

Determination of Staining Index (DL*)

Granules were evenly scattered on an asphalt sheet, and compacted and leveled, the granules not adhered to the surface were removed. The asphalt sheet, to which the granules were adhered, was placed in a 70° C. oven, and kept at the same temperature for 72 hours. The difference between L* values before and after being placed in the oven was measured with a CIE colorimeter, and recorded as DL*, referred as staining index. According to the present invention, the staining index DL* was used to characterize the oil absorption of the granules. The less DL* was, the less the oil absorption was.

Determination of the Water-Repellency Property 50 g sample was weighed and allowed to fall freely by gravity onto a platform and form a cone shape pile. Make a depression on the top of the pile with the test tube bottom, and 3 drops of water were placed in the depression. The period of time which it took for the beads to disappear indicated the water repellency of the granules.

Determination of Alkalinity Number

Alkalinity number was measured based on Test method per Asphalt Roofing Manufacturer Association Granule Test Manual.

X-Ray Diffraction Spectrum

An X-ray diffractometer, Model D/MAX2500, Rigaku Corporation, JP, was used in the test.

Example 1

Six pieces of the same lumpy tobelite ore were placed in shuttle kilns, heated to 600° C., 700° C., 850° C., 1050° C., 1200° C. and 1300° C. respectively, and kept at the same temperature for 24 hours. After being cooled, the calcined tobelite ore was crushed to 0.30-2.30 mm with a combination of a jaw crusher and a hammer crusher, and the particle size was adjusted with a circular vibrating sieve. 500 g of sand particulates of 0.30-2.30 mm were weighed, and placed in a 1 L container. To the container was added 75 g of sodium silicate solution having a module of 3 and a solid content of 30 wt %. The resulting material was mixed by shaking for 5 minutes. The mixed material was taken out, dried, and then placed in a corundum crucible. The crucible was placed in a muffle furnace, and heated to 900° C., and calcined for 1 hour. After being cooled, an appropriate amount of ceramic granules were sampled, and respectively measured for the SR values of the ceramic granules themselves and the ceramic granules on the asphalt sheet. The measured properties were shown in Table 2.

TABLE 2

Effect of the calcination temperature of the tobelite ore on the properties of the ceramic granules

| Sample No. | Calcination temperature of tobelite ore | SR of the granules themselves | DL* | Alkalinity number | SR of the granules on the asphalt sheet |
| --- | --- | --- | --- | --- | --- |
| 1 | 600° C. | 68% | 5.0% | 0.20 | 57% |
| 2 | 700° C. | 80% | 4.0% | 0.20 | 70% |
| 3 | 850° C. | 85% | 3.5% | 0.20 | 76% |
| 4 | 1050° C. | 90% | 3.0% | 0.20 | 84% |
| 5 | 1200° C. | 92% | 3.0% | 0.20 | 83% |
| 6 | 1300° C. | 93% | 2.0% | 0.20 | 68% |

It could be seen from the above Table 2 that, when the calcination temperature of tobelite ore was too high or too low, it would be adverse to achieve the benefit properties owned by the ceramic granules of the present invention, especially for being used on the asphalt sheet.

Example 2

Tobelite ore of 10 cm-30 cm was placed in a shuttle kiln, heated to 950° C., and kept at the same temperature for 24 hours. After being cooled, the calcined tobelite was crushed to 0.18-0.50 mm with a combination of a jaw crusher and a hammer crusher, and the particle size was adjusted with a circular vibrating sieve. 500 g of sand particulates of 0.18-0.50 mm were weighed, and placed in a 1 L container. To the container was added 75 g of sodium silicate solution having a module of 3 and a solid content of 30 wt %. The resulting material was mixed by shaking for 5 minutes. The mixed material was taken out, dried, divided into four parts, and then placed in different corundum crucibles. The four corundum crucibles were respectively calcined in a muffle furnace at different temperatures of 400° C., 800° C., 1200° C. and 1300° C., each for 1 hour. After being cooled, an appropriate amount of ceramic granules were sampled, and respectively measured for the SR values of the ceramic granules themselves and the ceramic granules on the asphalt sheet. The measured properties were shown in Table 3.

TABLE 3

Effect of the calcination temperature of the coating on the properties of the ceramic granules

| Sample No. | Calcination temperature of the coating | SR of the granules themselves | DL* | Alkalinity number | SR of the granules on the asphalt sheet |
|---|---|---|---|---|---|
| 7 | 400° C. | 75% | 10% | 20.00 | 60% |
| 8 | 800° C. | 82% | 3% | 0.20 | 73% |
| 9 | 1200° C. | 92% | 2% | 0.05 | 80% |
| 10 | 1300° C. | 93% | 2% | 0.05 | 67% |

It could be seen from the above Table 3 that, when the calcination temperature of the coating was too high or too low, it would be adverse to achieve the benefit properties owned by the ceramic granules of the present invention, especially for being used on the asphalt sheet.

Example 3

Tobelite ore of 10 cm-30 cm was placed in a shuttle kiln, heated to 900° C., and kept at the same temperature for 24 hours. After being cooled, the calcined tobelite was crushed to 0.30-2.30 mm with a combination of a jaw crusher and a hammer crusher, and the particle size was adjusted with a circular vibrating sieve. 500 g of sand particulates of 0.30-2.30 mm were weighed, and placed in a 1 L container. To the container was added 80 g of a sodium silicate solution having a module of 3 and a solid content of 33 wt %, wherein said sodium silicate solution contained 5 wt % of ZnO and 5 wt % of $TiO_2$. The resulting material was mixed by shaking for 5 minutes. The mixed material was taken out, dried, and then placed in a corundum crucible. The crucible was placed in an electric furnace, and heated to 1000° C. and calcined for 1 hour. After being cooled, the resulting material was placed in a 500 ml container. To the container was added 4 wt % SINO 2500 fluorocarbon water-proofing agent from Germany. The resulting material was mixed by shaking for 5 minutes, taken out and air-dried. Ceramic granules, which were white and opaque and had high-reflectivity, antiseptic property and water-repellency, were obtained, and their properties were shown in Table 4.

TABLE 4

Properties of high reflective, anti-septic and water-repellent ceramic granules

| Properties | SR of the granules themselves | DL* | Alkalinity number | SR of the granules on the asphalt sheet | water-repellent time |
|---|---|---|---|---|---|
| Values | 92% | 1% | 0.10 | 83% | 24 h |

What is claimed is:

1. Ceramic granules, which comprise sand core particulates and at least one coating thereon, wherein said sand core particulates are calcined tobelite, said at least one coating is an inorganic coating layer, and said ceramic granules have a reflectivity of 80%-93%, wherein said inorganic coating is a liquid inorganic coating selected from at least one of silicate, aluminum phosphate, silica sol and alumina sol, wherein said silicate is selected from sodium silicate, potassium silicate, aluminum silicate, lithium silicate or a mixture thereof.

2. Ceramic granules according to claim 1, wherein said calcined tobelite is obtained by calcining tobelite ore at 700-1200° C.

3. Ceramic granules according to claim 2, wherein the content of tobelite in said tobelite ore is 50 wt %-100 wt %, based on the weight of the tobelite ore.

4. Ceramic granules according to claim 2, wherein, by X-ray diffraction detection, said calcined tobelite contains a crystalline phase of aluminum silicate and/or a crystalline phase of mullite, and an amorphous phase; and it remains the laminated structure of tobelite.

5. Ceramic granules according to claim 4, wherein the crystallite size, obtained by calculation from the X-ray diffraction peak at 20.07° for aluminum silicate and the X-ray diffraction peak at 16.44° for mullite, is <35 nm.

6. Ceramic granules according to claim 1, wherein the sand core particulates coated with the inorganic coating layer are obtained by being calcined at 800-1200° C.

7. Ceramic granules according to claim 1, wherein said inorganic coating further comprises one or more substances selected from colorants, anti-algae agents, biocides, self-cleaning agents, viscosity modifiers, fluxing agents, flame retardant agents, surface tension modifiers and antiaging agents.

8. Ceramic granules according to claim 1, which further comprises an additional coating, which is obtained by secondly coating with an organic coating and/or a water-repellent agent, wherein said organic coating is a resin coating or an emulsion coating, and said water-repellent agent is a silicon-containing water-repellent agent or a fluorine coating fluorine-containing water-repellent agent.

9. Ceramic granules according to claim 1, which has a staining index DL* of 0.1%-6%.

10. Ceramic granules according to claim 1, wherein said ceramic granules produce a solar reflectivity of 70%-85% when being applied to the asphalt roll/sheet in a coverage of more than 90%.

11. Ceramic granules according to claim 1, wherein said ceramic granules produce a solar reflectivity of 72%-90% when being applied to the surface layer of polyurethane foam sheet.

12. Calcined tobelite granules, which are obtained by calcining tobelite ore at 700-1200° C., have a reflectivity of 80%-93%, and contain a crystalline phase of aluminum silicate and/or a crystalline phase of mullite, and an amorphous phase; and the granules remain the laminated structure of tobelite, wherein the crystallite size, obtained by calculation from the X-ray diffraction peak at 20.07° for aluminum silicate and the X-ray diffraction peak at 16.44° for mullite, is <35 nm.

13. Calcined tobelite granules according to claim 12, wherein the content of tobelite in said tobelite ore is 50 wt %-100 wt %, based on the weight of the tobelite ore.

14. A process for preparing ceramic granules, which comprises the following steps:
   a) calcining and crushing tobelite ore to obtain sand core particulates;

b) coating the sand core particulates with an inorganic coating, wherein said inorganic coating is a liquid inorganic coating selected from at least one of silicate, aluminum phosphate, silica sol and alumina sol, wherein said silicate is selected from sodium silicate, potassium silicate, aluminum silicate, lithium silicate or a mixture thereof; and c) calcining the sand core particulates coated with the inorganic coating to obtain ceramic granules, wherein said ceramic granules have a solar reflectivity of 80%-93%.

15. The process of claim 14, wherein the step (a) is conducted at 700-1200° C., and the step c) is conducted at 800-1200° C.

16. The process of claim 14, wherein said ceramic granules have a staining index DL* of 0.1%-6%.

* * * * *